(12) United States Patent
Dalbah et al.

(10) Patent No.: US 12,531,582 B2
(45) Date of Patent: Jan. 20, 2026

(54) METHODS, APPARATUSES AND NON-TRANSITORY COMPUTER-READABLE STORAGE DEVICES FOR BLIND POST-COMPENSATION

(71) Applicants: The Governors of the University of Calgary, Calgary (CA); Huawei Technologies Canada Co., Ltd., Kanata (CA)

(72) Inventors: Ahmad Dalbah, Calgary (CA); Hammam Orabi, Calgary (CA); Mohamed Helaoui, Calgary (CA); Fadhel Ghannouchi, Calgary (CA); Sahar Molla Aghajanzadeh, Ottawa (CA)

(73) Assignees: The Governors of the University of Calgary, Calgary (CA); Huawei Technologies Canada Co., Ltd., Kanata (CA)

( * ) Notice: Subject to any disclaimer, the term of this patent is extended or adjusted under 35 U.S.C. 154(b) by 120 days.

(21) Appl. No.: 18/631,402

(22) Filed: Apr. 10, 2024

(65) Prior Publication Data

US 2025/0323672 A1 Oct. 16, 2025

(51) Int. Cl.
*H04B 1/04* (2006.01)
*H04L 27/26* (2006.01)

(52) U.S. Cl.
CPC ....... *H04B 1/0475* (2013.01); *H04L 27/2623* (2013.01); *H04B 2001/0408* (2013.01)

(58) Field of Classification Search
CPC .......... H04B 1/0475; H04B 2001/0408; H04L 27/2623
See application file for complete search history.

(56) References Cited

U.S. PATENT DOCUMENTS 6,249,762 B1 * 6/2001 Kirsteins ........... H04L 25/03006
704/219
7,031,251 B2 * 4/2006 Chen ................... H04L 27/2623
370/208

(Continued)

OTHER PUBLICATIONS

Dukhyun Kim and G. L. Stuber, "Clipping noise mitigation for OFDM by decision-aided reconstruction," in IEEE Communications Letters, vol. 3, No. 1, pp. 4-6, Jan. 1999, doi: 10.1109/4234.740112.

(Continued)

*Primary Examiner* — Vineeta S Panwalkar
(74) *Attorney, Agent, or Firm* — Tim Tingkang Xia. , Esq.; Troutman Pepper Locke LLP

(57) ABSTRACT

A method of signal compensation in wireless communications is described. The method includes receiving a signal that has been distorted by a transmitter. This signal includes in-band (IB) components that include both data and distortion, and out-of-band (OOB) components that are indicative of distortion. The method includes decomposing the received signal to distinguish between the IB and OOB components. It then uses the content within the OOB components to reduce the distortion and produce a compensated signal. An apparatus and one or more non-transitory computer-readable storage devices configured to perform this method are also disclosed. With the embodiments described herein, improved signal fidelity is achieved, allowing for improved receiver performance without the need for additional reference signals or complex transmitter-side compensation mechanisms.

20 Claims, 10 Drawing Sheets

(56) References Cited

U.S. PATENT DOCUMENTS

| | | |
|---|---|---|
| 10,313,996 B2 | 6/2019 | Ghannouchi |
| 10,721,702 B2 | 7/2020 | Ghannouchi |
| 11,743,851 B2 | 8/2023 | Ghannouchi |
| 2010/0128764 A1 | 5/2010 | Debaillie |
| 2024/0015054 A1 | 1/2024 | Zhang et al. |
| 2024/0080053 A1 | 3/2024 | Velazquez et al. |

OTHER PUBLICATIONS

Al-Safadi, E. B., & Al-Naffouri, T. Y. (2012). Peak Reduction and Clipping Mitigation in OFDM by Augmented Compressive Sensing. IEEE Transactions on Signal Processing, 60(7), 3834-3839. https://doi.org/10.1109/tsp.2012.2193396.

Owodunni, D. S., Ali, A., Quadeer, A. A., Al-Safadi, E. B., Hammi, O., & Al-Naffouri, T. Y. (2014). Compressed sensing techniques for receiver based post-compensation of transmitter's nonlinear distortions in OFDM systems. Signal Processing, 97, 282-293. https://doi.org/10.1016/j.sigpro.2013.10.029.

Kim, K.-H., Park, H., No, J.-S., Chung, H., & Shin, D.-J. (2015). Clipping Noise Cancelation for OFDM Systems Using Reliable Observations Based on Compressed Sensing. IEEE Transactions on Broadcasting, 61(1), 111-118. https://doi.org/10.1109/tbc.2014.2374222.

M. Noweir et al., "Digitally Linearized Radio-Over Fiber Transmitter Architecture for Cloud Radio Access Network's Downlink," in IEEE Transactions on Microwave Theory and Techniques, vol. 66, No. 7, pp. 3564-3574, Jul. 2018, doi: 10.1109/TMTT.2018.2819665.

\* cited by examiner

METHODS, APPARATUSES AND NON-TRANSITORY COMPUTER-READABLE STORAGE DEVICES FOR BLIND POST-COMPENSATION

FIELD OF THE DISCLOSURE

The present disclosure relates generally to signal processing, and in particular to methods, apparatuses, and non-transitory computer-readable storage devices for blind post-compensation of signals.

BACKGROUND

Distortions in signals typically result from the interaction of the transmitted signal with various components in the transmission path, particularly a power amplifier (PA). The PA is used to amplify the signal to a level suitable for transmission, but its nonlinear input/output characteristics may introduce unwanted artifacts into the signal spectrum. Such distortions may manifest themselves in a variety of ways, including changes in signal amplitude and phase that compromise the integrity of the transmitted data.

High levels of distortion may lead to several adverse effects in communication systems. For example, the distortion may interfere with adjacent communication channels, resulting in degraded system performance and potential violations of spectral emission regulations. In addition, it may degrade signal quality, resulting in increased error rates and reduced data throughput. These effects are particularly pronounced in systems that require high fidelity and reliability, such as broadband wireless access and high-definition broadcasting.

SUMMARY

According to a first aspect of this disclosure, there is provided a method, comprising: receiving a signal that is distorted by a transmitter, wherein the received signal includes in-band (IB) components, at least some of which carry data and distortion, and out-of-band (OOB) components indicative of the distortion; decomposing the received signal to distinguish at least one of the IB components from at least one of the OOB components; and reducing the distortion in the received signal by using content in the at least one of the OOB components to output a compensated signal.

In some possible implementations, the decomposed signal may comprise one of non-contiguous subcarriers, contiguous subcarriers, or multiple sub-bands.

In some possible implementations, the reducing may comprise identifying distortion characteristics within the decomposed signal using the at least one of the OOB components; estimating an error associated with the at least one of the IB components using the identified distortion characteristics; and applying a compensator to the received signal to reduce the estimated error.

In some possible implementations, the method may further comprise: implementing one or more polynomials to model the distortion characteristics associated with the received signal; and forming the compensator with the polynomial.

In some possible implementations, the polynomial may be defined by a set of coefficients that model nonlinear effects of distortion on the received signal, the coefficients being adjusted using an algorithm comprising at least one of a Least Mean Squares (LMS) algorithm, a Recursive Least Squares (RLS) algorithm, a Normalized Least Mean Squares (NLMS) algorithm, or a Least Squares (LS) algorithm.

In some possible implementations, the estimating may further comprise: deriving an error signal from the at least one of the OOB components; inputting the derived error signal into the algorithm to update the coefficients of the polynomial; and iteratively updating the coefficients using an output of the algorithm until predetermined Error Vector Magnitude (EVM) criteria are met, wherein the EVM criteria are indicative of the compensated signal reaching a target fidelity threshold relative to the received signal.

In some possible implementations, the polynomial may be a memory polynomial that includes memory effects by incorporating additional coefficients corresponding to previous time instances of the received signal.

In some possible implementations, the method may further comprise: applying a Decision-Aided Reconstruction (DAR) to the compensated signal to restore clipped portions therein, including: performing a maximum likelihood estimation on Quadrature Amplitude Modulation (QAM) symbols; converting the QAM symbols to time-domain to perform a clipping restoration; and converting the restored signal back into the QAM symbols.

In some possible implementations, the method may further comprise setting a clipping threshold within the clipping restoration, wherein the clipping threshold is the maximum power of the compensated signal.

In some possible implementations, the method may further comprise, prior to the decomposing, making a second copy of the received signal, wherein the at least one of the IB components comprises randomly allocated subcarriers without carrying data, and wherein the reducing comprises: reducing the distortion of the at least one of the IB components using contiguous subcarriers of the at least one of the OOB components.

In some possible implementations, the compensating may comprise: extracting reserved subcarriers comprising the contiguous subcarriers of the at least one of the OOB components and the randomly allocated subcarriers of the at least one of the IB components; estimating an error associated with the received signal by compressive sensing the extracted reserved subcarriers by optimization; and generating the compensated signal with reduced distortion by a difference between the second copy of the received signal and the estimated error.

In some possible implementations, the method may further comprise, after the generating: demodulating the compensated signal into a compensated frequency-domain signal; and sampling the data subcarriers from the compensated frequency-domain signal to obtain the compensated signal.

In some possible implementations, the received signal may be without predetermined information about the distortion in the IB components.

According to a second aspect of this disclosure, there is provided an apparatus comprising: one or more circuits configured to execute instructions stored in one or more memories and cause the apparatus to perform actions comprising: receiving a signal that is distorted by a transmitter wherein the received signal includes in-band (IB) components, at least some of which carry data and distortion, and out-of-band (OOB) components indicative of distortion; decomposing the received signal to distinguish at least one of the IB components from at least one of the OOB components; and reducing the distortion in the received signal by using content in the at least one of the OOB components to output a compensated signal.

In some possible implementations, the reducing may comprises identifying distortion characteristics within the decomposed signal using the at least one of the OOB components; estimating an error associated with the at least one of the IB components using the identified distortion characteristics; and applying a compensator to the received signal to reduce the estimated error.

In some possible implementations, the actions may further comprise, prior to the decomposing, making a second copy of the received signal, wherein the at least one of the IB components comprises randomly allocated subcarriers without carrying data, and the reducing may comprise reducing the distortion of the at least one of the IB components using contiguous subcarriers of the at least one of the OOB components.

According to a third aspect of this disclosure, there is provided one or more non-transitory computer-readable storage devices comprising computer-executable instructions, wherein the instructions, when executed, cause one or more circuits to perform actions comprising: receiving a signal that is distorted by a transmitter wherein the received signal includes in-band (IB) components, at least some of which carry data and distortion, and out-of-band (OOB) components indicative of distortion; decomposing the received signal to distinguish at least one of the IB components from at least one of the OOB components; and reducing the distortion in the received signal by using content in the at least one of the OOB components to output a compensated signal.

In some possible implementations, the reducing may comprise: identifying distortion characteristics within the decomposed signal using the at least one of the OOB components; estimating an error associated with the at least one of the IB components using the identified distortion characteristics; and applying a compensator to the received signal to reduce the estimated error.

In some possible implementations, the actions may further comprise, prior to the decomposing, making a second copy of the received signal, wherein the at least one of the IB components comprises randomly allocated subcarriers without carrying data, and the reducing may comprise reducing the distortion of the at least one of the IB components using contiguous subcarriers of the at least one of the OOB components.

With above-described features, the methods disclosed herein may improve communication by using OOB components for signal correction, eliminating the need for reference signals and simplifying the overall system. This results in reduced computational demands and enhanced power efficiency. The integration of Compressed Sensing may further optimize performance, allowing for effective signal reconstruction with fewer samples.

This summary does not necessarily describe the full scope of all aspects. Other aspects, features and advantages will become apparent to those of ordinary skill in the art upon review of the following description of specific embodiments.

BRIEF DESCRIPTION OF THE DRAWINGS

For a more complete understanding of the disclosure, reference is made to the following description and accompanying drawings, in which.

DETAILED DESCRIPTION

Figure 1:
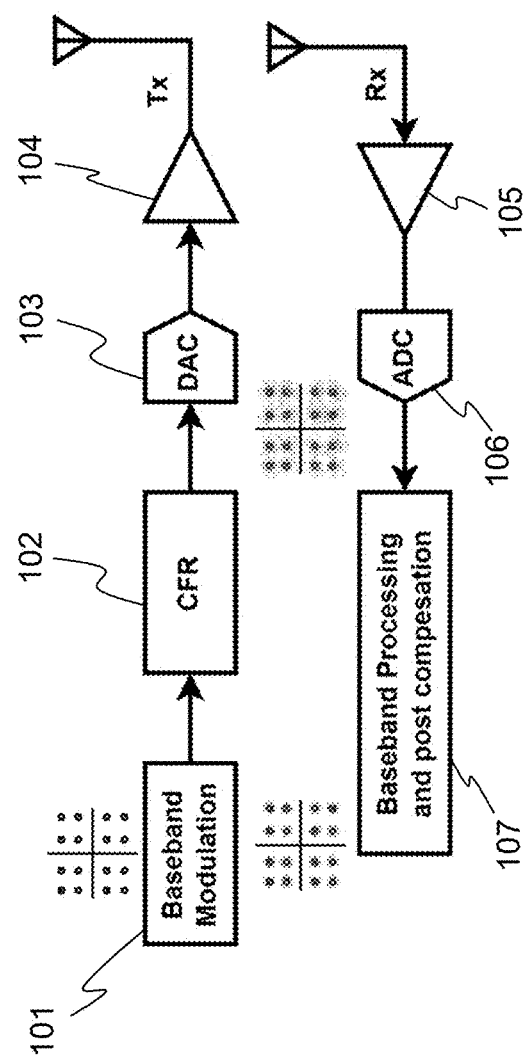
FIG. 1 is a simplified schematic diagram of a communication system employing post-compensation for signal distortion as part of the baseband processing, according to some embodiments of this disclosure.

Distortion in communication systems is caused by a variety of factors including, but not limited to, back-end digital baseband processes and front-end analog component operations. In particular, crest factor reduction (CFR) techniques in the digital baseband and the nonlinear characteristics of power amplifiers (PAs) in the analog domain can be primary sources of such distortion.

The nonlinearity of the PA may lead to the creation of new frequency components that invade the spectral neighborhood of the signal. This encroachment may result in unwanted interference, which can affect the reliability of the transmission. The manifestations of these nonlinearities are diverse, including gain compression, nonlinear phase shifts, and memory effects, all of which challenge the integrity and efficiency of the communication system.

To avoid the saturation region of the PA, which would otherwise reduce the power-added efficiency (PAE), a high input back-off (IBO) strategy is typically employed. However, this strategy is not without its trade-offs, as it requires the PA to operate under less than optimal conditions due to its inherent nonlinearity.

Hard clipping (HC) is often used as a remedy to improve PAE by reducing the amplitude of the signal beyond a certain threshold, thereby mitigating the high peak-to-average power ratio (PAPR) often found in such systems. However, the amount of clipping is directly related to the amount of distortion introduced into the signal.

Digital Pre-Distortion (DPD) is a technique that aims to preemptively counteract the nonlinear distortion introduced by the PA. This is achieved by capturing the output of the PA through a feedback loop and using adaptive learning algorithms to formulate an accurate inverse model of the nonlinear behavior of the PA. Consequently, the input to the PA is pre-distorted according to this inverse model to facilitate a more linear output. Despite the effectiveness of DPD, it introduces additional complexity and requires additional feedback implementation hardware and high-speed analog-to-digital converters (ADCs). These complexities are compounded when the DPD technique is applied to multiple-input multiple-output (MIMO) systems. The precision required by the adaptive estimator is also escalated by the presence of linear and nonlinear radio frequency (RF) signal leakage across different RF branches. Furthermore, the sensitivity of DPD to different beam steering angles cannot be underestimated, along with its propensity to increase the PAPR, which inversely affects the PAE by requiring further back-off to avoid PA saturation.

As an alternative to DPD, post-compensation (PC) mechanisms have been considered, where compensation for PA distortion is offloaded to the receiver side. This technique reduces the computational and circuit complexity requirements at the transmitter, particularly for mobile device implementations where processing speed and power constraints are prevalent. Offloading the compensation process to the receiver eliminates the need for high-speed ADCs and digital-to-analog converters (DACs) at the transmitter. In addition, the PAPR of the signal remains unaffected by any pre-distortion.

For example, FIG. 1 illustrates a schematic of a communication system 100 employing PC for compensating signal distortion, shown as part of the baseband processing. This system 100 is designed to manage and mitigate distortion typically introduced by a PA stage 104 in the transmission (Tx) path.

The initial stage of the process begins with a baseband modulation stage 101, where the information to be transmitted is converted into a baseband signal (the 16 dots associated with the baseband modulation stage 101 represent original data). This signal is then subjected to a CFR stage 102, which aims to reduce the peaks in the signal to mitigate the potential for high PAPR, which may adversely affect the performance of the PA stage 104.

Following the CFR stage 102, the signal undergoes a DAC stage 103. The DAC stage 103 serves as an interface between the digital baseband processing and the analog components of the transmitter. It converts the processed digital baseband signal to an analog format suitable for transmission over the airwaves through the PA stage 104. The PA stage 104 then amplifies the analog signal to a level suitable for transmission. However, this amplification typically introduces distortion due to the inherent nonlinearities of the PA stage 104.

At the receiving end (Rx), the signal is picked up and converted back to a digital format by an ADC stage 105. It can be seen that there are distortions in the signal after the ADC stage 105 (the 16 dots associated with the ADC stage 105 represent distorted data). This digital signal, which now contains distortions resulting from the transmission process, in particular the nonlinear characteristics of the PA stage 104, is then processed in a PC stage 106. In this stage, the system applies a series of signal processing algorithms designed to identify and compensate for the distortions introduced during transmission. The post-compensation processing mitigates not only the effects of the PA, but also some other distortions, such as those introduced by the transmission medium or the receiver front end.

By implementing compensation at the PC stage 106, the system 100 does not require any changes to the PAPR of the transmitted signal, as would typically be required by pre-distortion techniques such as DPD. This results in a more efficient system that maintains the integrity of the transmitted signal's power characteristics and reduces the need for complex, power-consuming processing at the transmitter.

The present disclosure is directed to a method for compensating for the distortions typically introduced by the nonlinearities of the PA. This method is particularly adept at utilizing the spectral characteristics of out-of-band (OOB) components, which are byproducts of the nonlinear amplification process, to facilitate compensation of the in-band (IB) components that carry the essential data.

Figure 2:
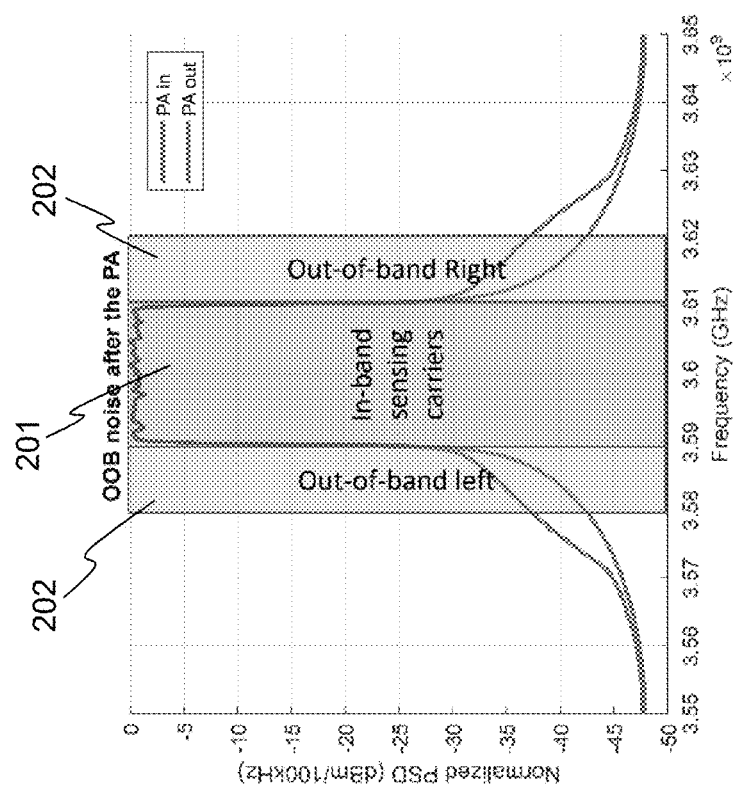
FIG. 2 is an example graphical representation of the frequency spectrum of a received signal, illustrating the distinction between out-of-band components and in-band components, as shown in FIG. 1.

As shown in FIG. 2, the frequency spectrum of a received signal is depicted, with a clear distinction between the out-of-band (OOB) components within region 202 and the in-band (IB) components within region 201. The IB region 201, which is central to data transmission, extends along the frequency axis measured in gigahertz (GHz) and is populated with the primary subcarriers that fall within the allocated signal bandwidth. These subcarriers, which compose the IB components of the received signal, serve as the primary channels for data transmission, and preserving their integrity is of importance in signal processing. However, the IB region 201 is susceptible to the distortion effects imposed by the PA.

Conversely, the OOB region 202, which includes the OOB components of the received signal, is outside the core transmission band and is often associated with the unintended emissions resulting from the nonlinear behavior of the PA and other components on the transmitter side. FIG. 2 shows a comparative view of the signal with and without amplification by the PA, illustrating the distortion artifacts introduced during the amplification process along the normalized power spectral density (PSD) axis (measured in dBm/100 kHz).

Various embodiments described herein utilize the distinct characteristics exhibited by OOB distortions to indirectly assess and correct IB distortions. This method utilizes the distortions within the OOB region 202 as indicators of the nonlinear behavior of the PA, thereby providing a means to infer the nature of the distortion within the IB region 201 without relying on a predetermined distortion signature.

The method as described herein may be referred to as blind post-compensation, forgoing the conventional requirements of additional hardware and reference signals traditionally employed for distortion characterization. Integral to this method is the ADC on the receiver side, which is configured to capture the spectrum of the incoming signal, including the OOB regions. This comprehensive spectral capture allows the received signal to be decomposed to distinguish the IB components from the OOB components, enabling a thorough analysis of the distortion characteristics.

Non-contiguous subcarriers are characteristic of certain types of signals, such as those used in Orthogonal Frequency Division Multiplexing (OFDM). OFDM signals include a number of subcarriers that are spaced at precise intervals to allow parallel transmission of data over multiple discrete frequencies. This spacing is designed to maintain orthogonality between the subcarriers, thereby preventing intercarrier interference and efficiently utilizing the available bandwidth. Contiguous subcarriers, on the other hand, form a continuous band of frequencies used for signal transmission. An example of this type of system is Wideband Code Division Multiple Access (WCDMA), in which a single subcarrier is modulated to cover a wide band of frequencies. WCDMA and similar signals benefit from the contiguous arrangement by simplifying receiver design and allowing a consistent approach to channel equalization across the band. Multiple sub-bands refers to a signal architecture in which the transmission band is segmented into multiple distinct frequency blocks, each operating as an independent subband. This can be observed in systems using subcarrier aggregation techniques, where multiple bands are used simultaneously to increase the data rate and improve the overall capacity of the system.

In some embodiments, the signal may therefore be decomposed into one of non-contiguous subcarriers, contiguous subcarriers, or multiple sub-bands, depending on the specific needs of the communication system. This choice affects several aspects of system design, from modulation and error correction strategies to interference management and spectral efficiency maximization. The ability to operate within any of these architectures underscores the versatility and adaptability of the embodiments described herein.

In some embodiments, signal processing may include algorithms that operate in the frequency domain to manipulate quadrature amplitude modulation (QAM) symbols. These algorithms are integrated into the digital signal processing (DSP) framework of the receiver, which performs the task of distortion estimation and generation of a compensated signal. Clipping noise compensation may also be performed with precision on an oversampled signal, ensuring accurate identification of clipping effects and allowing precise restoration of the signal's original amplitude profile. These additional operations are described below along with various embodiments.

It should be appreciated that although OFDM signals are used as an example in various embodiments in the description, it is important to recognize that the applicability of the disclosed methods is not limited to these alone. The distortion compensation methods described herein may be beneficial for a variety of signal types, such as WCDMA. Whether the signal originates from a simple wireless communication system or a complex multi-carrier arrangement, or even a wired communication system, the present disclosure stands as an effective approach to achieving signal fidelity through blind post-compensation methods.

Figure 3:
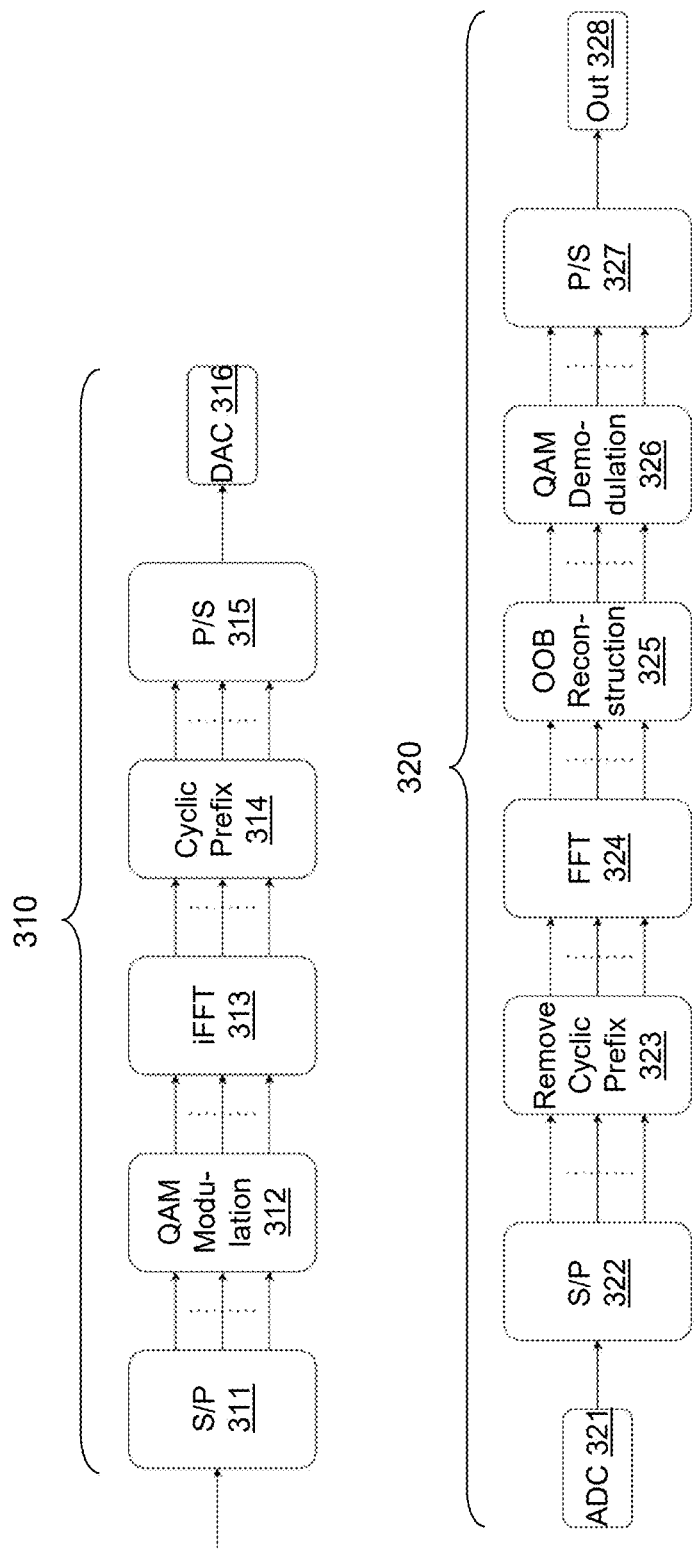
FIG. 3 is an example process of a communication system, depicting a transmitter side process and a receiver side process, according to some embodiments of this disclosure.

FIG. 3 illustrates a schematic of an example OFDM communication system, showing a transmitter side process 310 and a receiver side process 320, each including a series of signal processing blocks that facilitate the modulation, transmission, and demodulation of data, in accordance with one embodiment described herein.

The transmitter side process 310 begins with a transmitter Serial/Parallel (S/P) block 311, which transforms the input bitstream into parallel data streams to prepare for modulation. Following this, QAM modulation block 312 performs modulation on the parallel data streams, encoding the data onto subcarrier waves by varying the amplitude of two orthogonal subcarrier waves, in preparation for OFDM transmission.

An inverse Fast Fourier Transform (iFFT) block 313 then takes these QAM symbols and transforms them into the time domain, creating OFDM symbols by assigning each symbol to a specific subcarrier frequency. To mitigate intra-symbol interference, a cyclic prefix block 314 may be involved, copying part of the end of the OFDM symbol and appending it to the beginning. A transmitter Parallel/Serial (P/S) block 315 may revert the parallel OFDM symbols back into a serial data stream, which is then passed to a DAC block 316. The DAC converts the digital signal to an analog signal suitable for transmission over a wireless or wired physical medium.

The receiver side process 320 starts with an ADC block 321, which captures the transmitted analog signal and converts it back into a digital format. A receiver S/P block 322 then prepares the digital signal for processing by a Fast Fourier Transform (FFT) block 324. The FFT block 324 performs the reverse of the iFFT at the transmitter, converting the time domain OFDM symbols back into the frequency domain. A Remove Cyclic Prefix block 323 may discard the cyclic prefix added on the transmitter side to isolate the original OFDM symbols.

In this embodiment, an OOB Reconstruction block 325 is then introduced. This block utilizes the OOB components, which are typically the byproducts of PA nonlinearities, to estimate and subsequently compensate for the distortion within the IB components without interfering with the standard demodulation process. In some cases, the received waveform may be oversampled by interspersing empty (zero-valued) QAM symbols within the signal, thus broadening the spectrum with an Oversampling Ratio (OSR) of 5, for example. Oversampling at the receiver side may be advantageous to further separate the OOB components from the IB components.

After the signal has been processed by the OOB Reconstruction block 325, a QAM Demodulation block 326 performs the inverse of QAM modulation, retrieving the original parallel data streams from the frequency domain representation. Finally, a receiver P/S block 327 converts these parallel data streams back into a serial bitstream, which is output from an output block 328 as the demodulated and compensated data.

Figure 4:
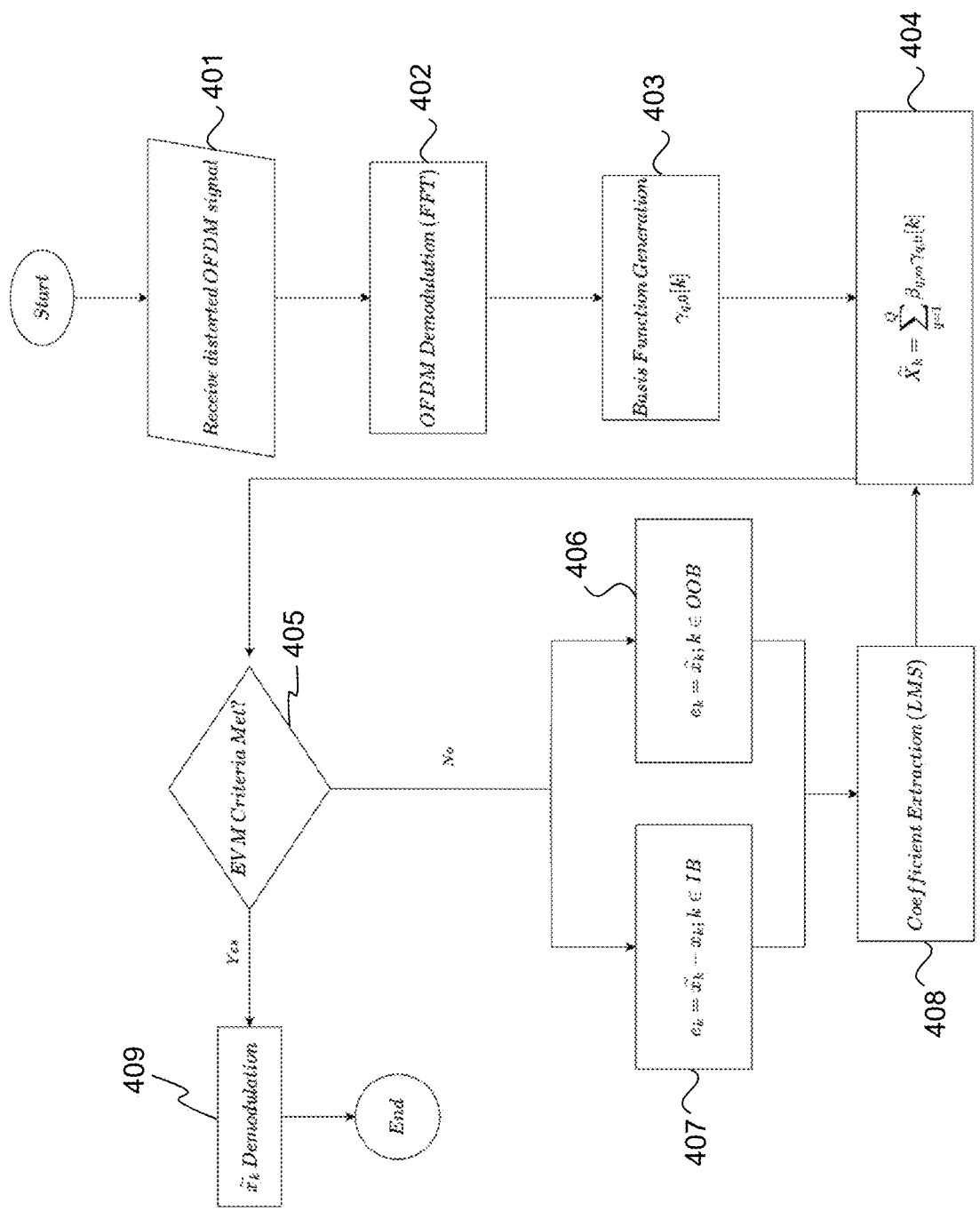
FIG. 4 is an example flowchart illustrating a process for signal reconstruction in a receiver using blind post-compensation, according to some embodiments of this disclosure.

FIG. 4 illustrates an example flowchart describing an algorithm for signal reconstruction in the context of a receiver that employs blind post-compensation, according to one embodiment. The process is for a typical OFDM receiver's demodulation sequence, incorporating steps for OOB reconstruction that operate without interfering with other receiver functions.

The process begins at 401, where a distorted OFDM signal is received. This signal includes both IB and OOB components, with both containing distortion characteristics resulting from the nonlinearities of the power amplifier (PA). Following reception, the signal undergoes OFDM demodulation at 402. This may be typically executed using FFT, which converts the time-domain signal into its frequency-domain constituents, making the IB and OOB components distinguishable for further processing.

At 403, basis function generation occurs. In this embodiment, a memory polynomial $\gamma_{q,0}[k]$ may serve as the basis function, representing the behavior of the PA and the distortions embedded within the signal. This polynomial is a form of post compensator, designed to mitigate the distortion post-reception. The memory polynomial may be tailored to encapsulate both the immediate and past behaviors of the signal, reflecting the memory effects inherent in PA distortions. While a memory polynomial is used here, the method may be extended to other basis functions, such as the Volterra series based models and box models such as the Hammerstein-Wiener model to model different distortion characteristics.

Block 404 denotes the generation of an estimated signal, $\tilde{X}_k$, using coefficients $\beta_{q,m}$ for the polynomials from block 403, where $\tilde{X}$ is the estimated signal, k is the subcarrier index, $\beta$ is the coefficient of the polynomial, q is the nonlinearity order, and m is the memory depth of the memory polynomial. In this embodiment, m may be equal to 0. These coefficients help to form the compensator that will act on the distorted signal to mitigate the distortions.

The process then transitions to block 405, where a decision is made based on whether Error Vector Magnitude (EVM) criteria have been met. The EVM criteria are a measure of the quality of the reconstructed signal and determine if further iteration is necessary. If the EVM criteria are not satisfied, the algorithm proceeds to blocks 406 and 407, where errors associated with the IB and OOB components are obtained. For the IB components, the error is the difference between the estimated IB components and the actual received distorted IB components, whereas for the OOB components, the error is simply the estimated OOB components, because only distortions are carried in the OOB components.

The error $e_k$ in this case can be modeled as a piecewise function as shown in equation 1.

$$\begin{cases} e[k] = \tilde{x}[k] - x[k]; & k \in IB \\ e[k] = \tilde{x}[k]; & k \in OOB \end{cases} \quad (1)$$

A Coefficient Extraction block 408 may use Least Mean Squares (LMS) algorithm or other adaptive algorithms such as Recursive Least Squares (RLS), Normalized LMS (NLMS), or standard Least Squares (LS) to adjust the coefficients of the polynomial based on the error signals derived from the IB and OOB components.

Upon satisfying the EVM criteria or reaching a predefined number of iterations, the process culminates at block 409, where the signal is demodulated to extract the QAM symbols from the compensated and reconstructed signal, resulting in a signal with reduced distortion. In other words, this iterative loop may continue until the signal quality meets the predefined EVM criteria, ensuring that the reconstructed signal is a faithful representation of the original signal, with minimized noise or distortion. The methods of using the OOB components as a reference for distortion characterization allow for a blind compensation method that does not rely on any known reference signals at the receiver (the absence of a need for a reference signal is what characterizes this method as "blind"), making it a highly efficient in signal processing systems.

An example algorithm for OOB aided reconstruction may be represented by the following codes:

```
Input: Distorted OFDM Signal x[k]
Output: Reconstructed OFDM Signal x̃[k]
         Initialization: β_{1,0} = 1
1:       Basis Function Generation γ[k]
2:       while EVM > 3% do
3:         Filter the received signal
           x̃[k] = γ[k] · β_{q,m}
4:         EVM Calculation
5:         e[k] = x̃[k] – x[k]    ; k ∈ IB
           e[k] = x[k]            ; k ∈ OOB
6:         β_{q_m}(i + 1) = β_{q_m}(i) – μR^{-1} γ^H e(i)
7:       end while
8:       return x̃[k]
```

Figure 5:
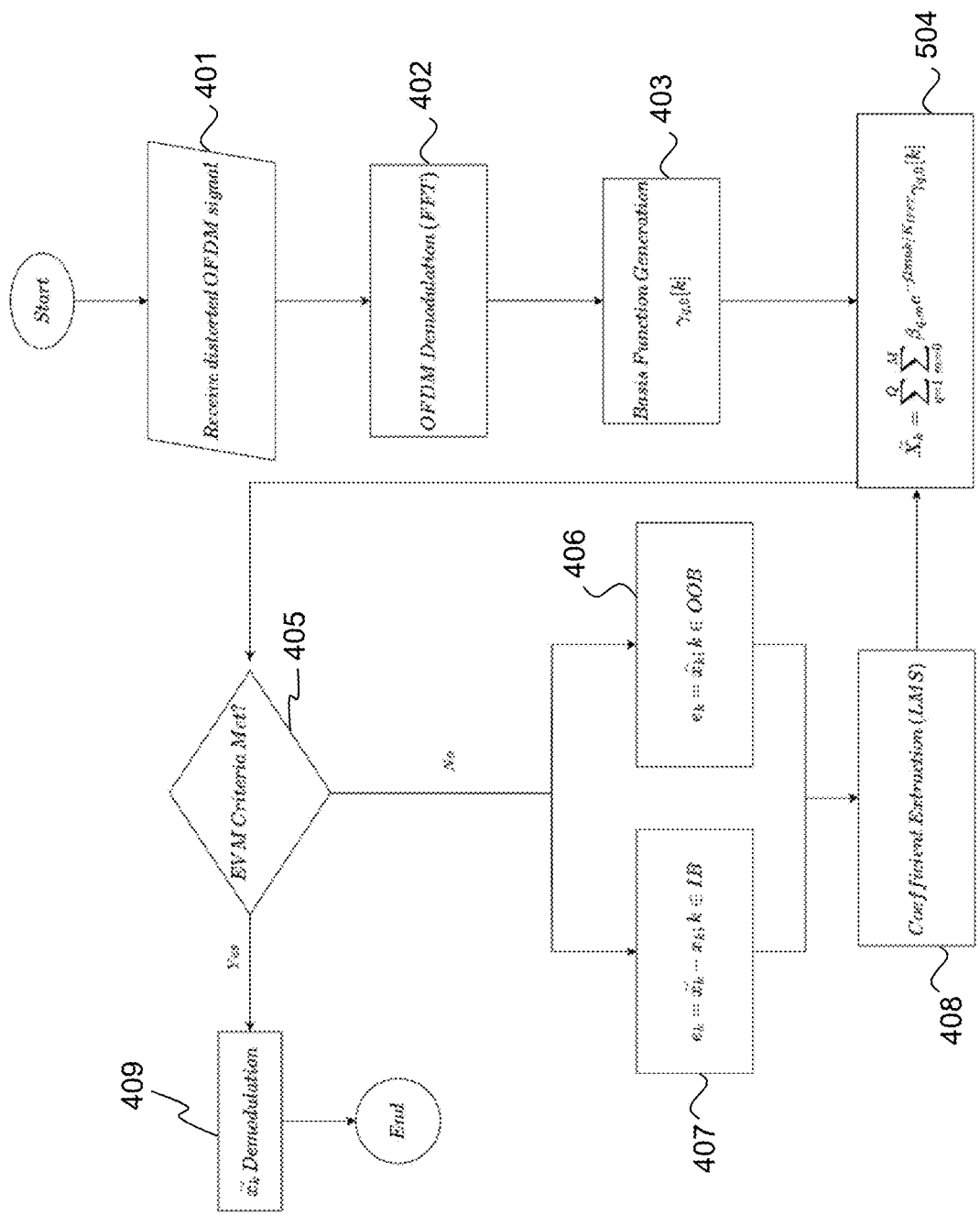
FIG. 5 is an example flowchart illustrating a process for signal reconstruction in a receiver incorporating memory effects in the compensation process, according to some embodiments of this disclosure.

FIG. 5 illustrates an example flowchart describing an algorithm for signal reconstruction in the context of a receiver that employs blind post-compensation, according to another embodiment. In FIG. 5, all the blocks are the same as those in FIG. 4 except block 504, which represents an alteration in the signal processing algorithm, particularly concerning the incorporation of memory effects into the post-compensation method. This block is focused on the generation of an estimated signal, $\tilde{X}_k$, that has been modified to account for memory effects which are a result of complex frequency responses affecting Bit Error Rate (BER) and EVM.

The memory polynomial employed in this process is designed to capture not only the instantaneous nonlinear effects but also the influence of past transmitted symbols on the current symbol being processed. This is achieved by augmenting the polynomial with additional coefficients, $e^{-j2\pi mk/K_{IFFT}}$, which correspond to previous time instances of the received signal. These coefficients allow the polynomial to model the behavior of the PA with greater accuracy, accounting for the temporal correlations introduced by the memory effects.

In block 504, the sum represents the reconstruction of the estimated signal by summing over all the basis functions weighted by their respective coefficients, which have now been expanded to include memory terms. In this embodiment, m may be greater than 0. The incorporation of these memory terms allows the compensator to adapt to the dynamic nature of the distortion, providing an accurate and robust compensation mechanism.

In certain scenarios where the memory effects are particularly complex, a two-stage reconstruction may be utilized. Initially, a memoryless reconstruction may be applied to provide a preliminary estimate of the signal. Following this, the memory polynomial is applied to refine this estimate, thereby enhancing the signal's fidelity further. This two-stage method ensures that the compensator can handle a wide range of distortion complexities, making it versatile and effective across different communication environments.

Figure 6:
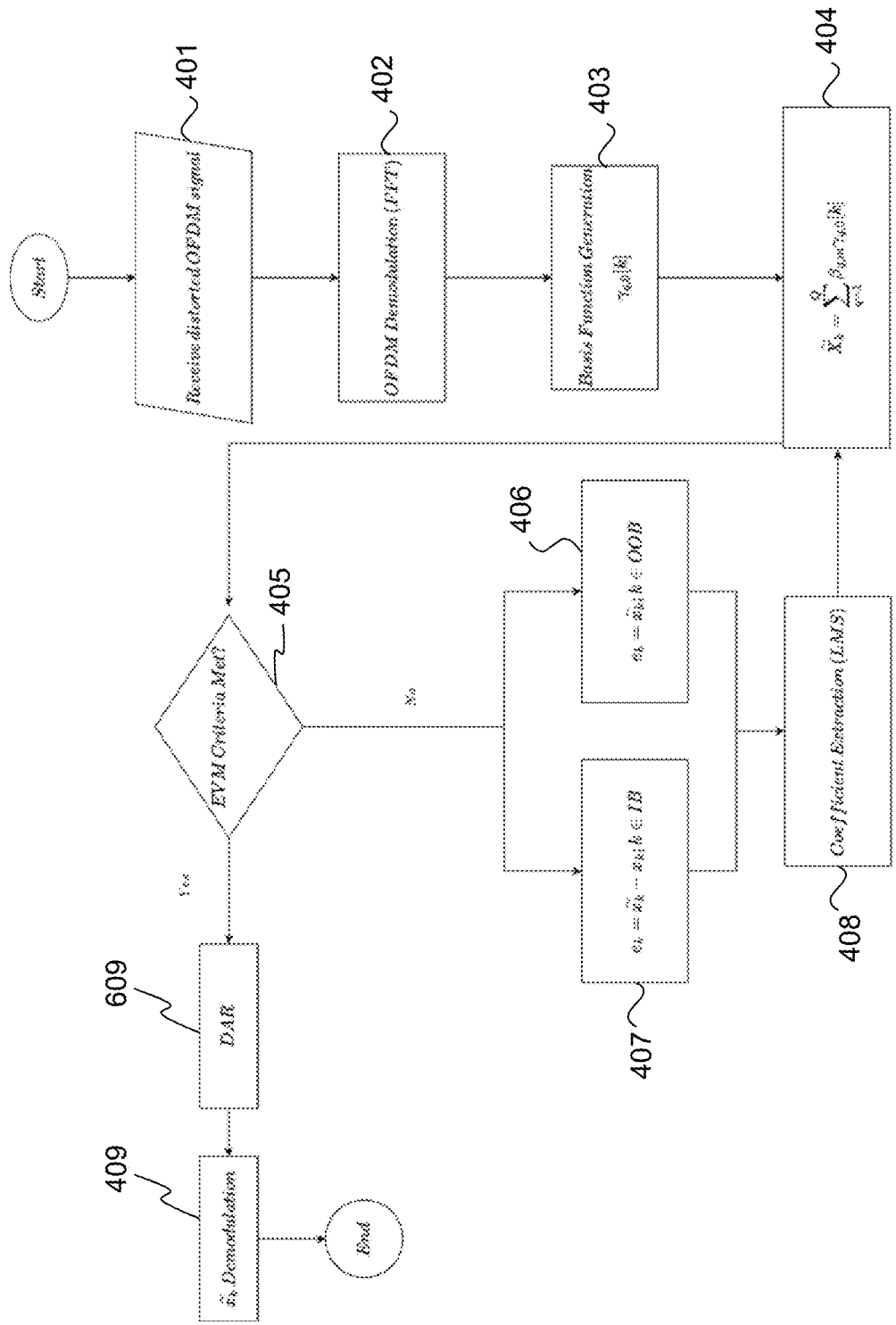
FIG. 6 is an example flowchart illustrating a process that incorporates a decision-aided reconstruction process into the process shown in FIG. 4.

FIG. 6 illustrates an example flowchart describing an algorithm for signal reconstruction in the context of a receiver that employs blind post-compensation, according to yet another embodiment. In FIG. 6, all the blocks are the same as those in FIG. 4 except block 609, which represents an alteration in the signal processing algorithm, particularly concerning an additional stage in the signal processing algorithm—Decision-Aided Reconstruction (DAR). This stage may be beneficial for situations where the signal has been subjected to clipping noise in conjunction with PA nonlinearity. Unlike the earlier stages of the algorithm, which focus primarily on correcting phase distortions using a polynomial-based post-compensation process, DAR addresses the challenge of clipping noise.

In this embodiment, the DAR process begins after the iterative loop, marked by the EVM criteria check at 405. Once the polynomial coefficients are optimized and the EVM criteria indicate that the phase distortions have been satisfactorily compensated, the signal proceeds to the DAR stage for further refinement at 609. Here, the compensated signal undergoes a further reconstruction to restore any clipped portions.

Figure 7A:
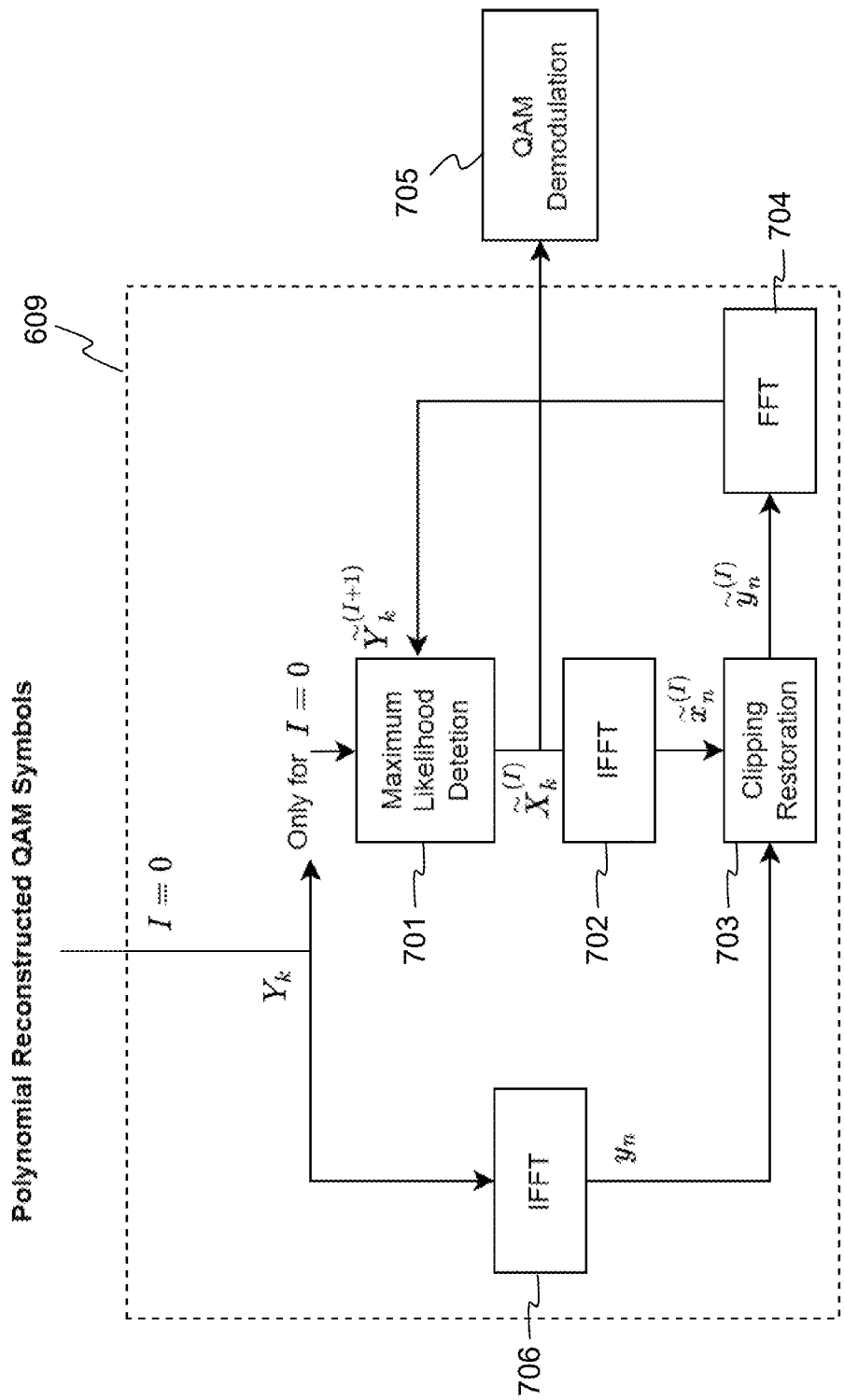
FIG. 7A is an example flowchart of the decision-aided reconstruction process used in signal compensation as shown in FIG. 6.

FIG. 7A illustrates an example flowchart of the process involved in the DAR stage 609. Polynomial reconstructed QAM symbols are firstly received for the DAR stage 609. Initially, the reconstructed QAM symbols are input into the DAR stage 609, indicated by "I" for the iterations. Block 701 is dedicated to Maximum Likelihood Detection, applied exclusively when I equals zero, for identifying the positions and magnitudes of clipping within the signal. The output of block 701 may be represented by $$\tilde{X}_k^{(I)},$$

where k indicates the subcarrier index. Following detection, block 702 employs an Inverse Fast Fourier Transform (IFFT) to revert the signal to the time domain, enabling the remediation of clipping distortions. The output of block 702 may be represented by $$\tilde{x}_n^{(I)},$$

where n indicates time-domain sample index. Subsequently, block 703 performs the clipping restoration, rectifying the clipped signal sections and re-establishing the original amplitude characteristics that were compromised due to clipping. The output of block 703 may be represented by $$\tilde{y}_n^{(I)},$$

where y indicates the restored signal (in the time domain) as compared to the received signal x. It should be noted that if the initial iteration is not zero, block 701 may be skipped and the signal (represented by $Y_k$) is directly subject to another IFFT block 706 to be converted to the time domain (represented by $y_k$), before entering block 703.

Post-restoration, block 704 applies an FFT to transition the signal back to the frequency domain, and then "I" is incremented by 1, as represented by $$\tilde{Y}_k^{(I+1)}.$$

This domain now encompasses the DAR reconstructed QAM symbols and is likely a more faithful representation of the initial transmitted signal. The output of block 704, after incremented, is then subject to further detection at block 701 to determine the level of clipping. After a user-set number of iterations, the DAR reconstructed QAM symbols can be output at block 705, which corresponds to the block 409 in FIGS. 5 and 6, as the final result.

Figure 7B:
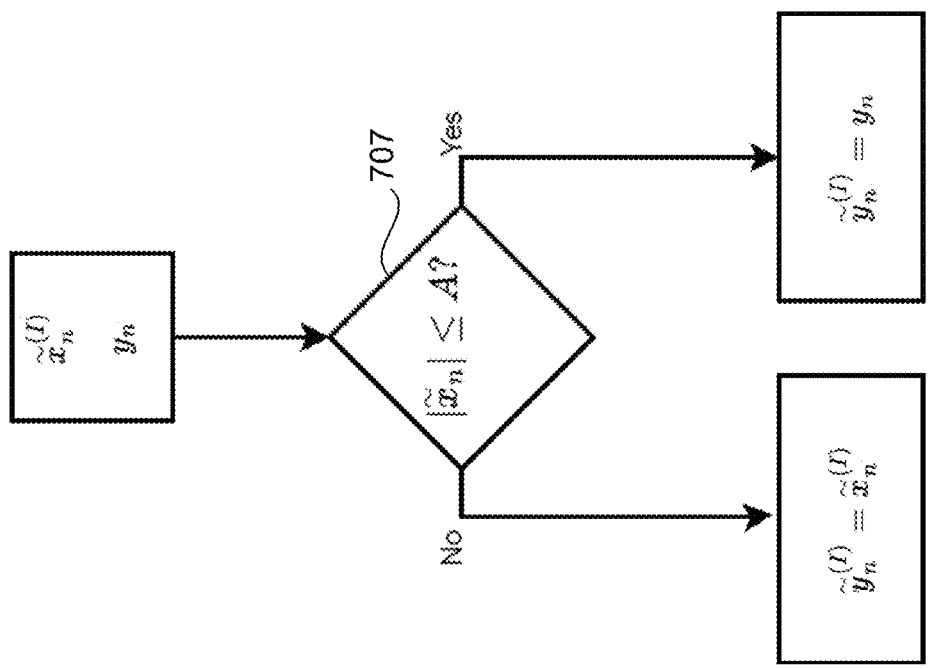
FIG. 7B is an example process to determine if additional clipping restoration is desired based on the example flowchart of FIG. 7A.

FIG. 7B illustrates another block 707 that may receive the outputs from both blocks 706 and 702 to determine if additional clipping restoration is desired. The output from block 706 refers to the original received OFDM sample $y_n$, and the output from block 702 refers to the DAR reconstructed OFDM sample $$\tilde{x}_n^{(I)}.$$

The DAR reconstructed OFDM sample is then compared with a predetermined threshold "A". If it is equal to or less than the threshold, the clipping restoration can be skipped and $y_n$ is the output. If it is greater than the threshold, additional clipping restoration is desired and $$\tilde{x}_n^{(I)}$$

is the output that will be subject to the clipping restoration by the block 703.

To maintain the "blind" nature of the method, which requires no a priori knowledge of the signal's distortion characteristics, the clipping threshold for the DAR process may be pragmatically set at the maximum sample power of the compensated signal. This self-referential thresholding ensures that the DAR process remains adaptive and does not rely on external references.

Figure 8:
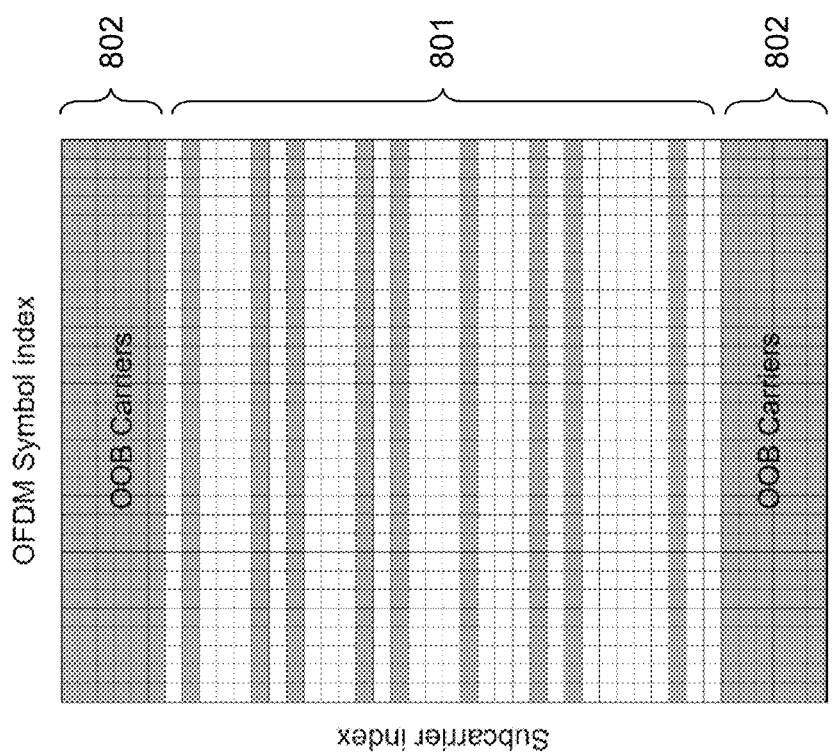
FIG. 8 is a simplified graphical representation of subcarrier allocation for the OOB Aided Compressed Sensing (OOB-CS) within the framework of an OFDM system, according to some embodiments of this disclosure.

FIG. 8 illustrates the subcarrier allocation for an Out-of-band Aided Compressed Sensing (OOB-CS) technique within an OFDM framework, as part of a further embodiment of the present disclosure. This embodiment aims to elevate the performance of Compressed Sensing (CS) in the context of clipping and PA distortion cancellation.

In conventional CS, the technique exploits the sparsity of a signal in a given domain to reconstruct it from fewer samples than traditionally required by the Nyquist sampling theorem. This may be advantageous for signals that are sparse or compressible in their representation. In the context of OFDM systems, a subset of the available subcarriers, referred to as IB cells, can be designated for noise only or left unmodulated. These IB cells, which are essentially unused for the transmission of user data, serve as a reference for the CS algorithm to sample and reconstruct the sparse signal. By sampling these noise-only subcarriers, CS techniques may estimate the necessary information to reconstruct the original signal with high accuracy while reducing the overall sampling and processing requirements.

The OOB-CS method according to the embodiments described herein may take advantage of spectral regrowth—regions where pure noise is present due to the nonlinearities of the PA—to improve the quality of the signal restoration. By sampling this spectral regrowth, the OOB-CS method increases the number of data points available to reconstruct the signal, similar to having a greater number of IB tones for distortion characterization.

In FIG. 8, the vertical axis represents the subcarrier index, indicating the temporal sequence transmitted over time, while the horizontal axis represents the OFDM symbol index, corresponding to the various frequency components that make up each OFDM symbol. Within this frame, two distinct areas may be allocated for CS:

1. Randomly allocated IB subcarriers in an IB region 801, depicted by grey cells, which carry pure noise information. These subcarriers are distributed across the OFDM frame in a non-uniform manner, thereby providing a scattered sampling of the signal across the frequency spectrum.
2. Contiguous OOB subcarriers in OOB regions 802, also depicted by grey cells at the top and bottom borders of the frame, carry pure noise information. These subcarriers are uniformly allocated and are intended to capture the spectral regrowth that falls outside the main band of interest, the IB region 801.

The sensing matrix utilized at the receiver for this OOB-CS method is thus a composite of both randomly allocated IB subcarriers and uniformly allocated OOB subcarriers. The receiver may capture the signal at a sampling rate higher than the Nyquist rate, for detecting the OOB spectral regrowth.

The dual utilization of randomly allocated IB subcarriers for capturing the signal's intrinsic noise and data characteristics, along with contiguous OOB subcarriers for exclusively capturing the PA-induced distortion may be advantageous, because it allows for a more comprehensive and accurate estimation of the signal distortion and enables a more effective reconstruction of the original signal. In addition, through the use of this OOB-CS method, it is possible to improve the signal's restoration quality without the need for a priori knowledge of the distortion characteristics.

Figure 9:
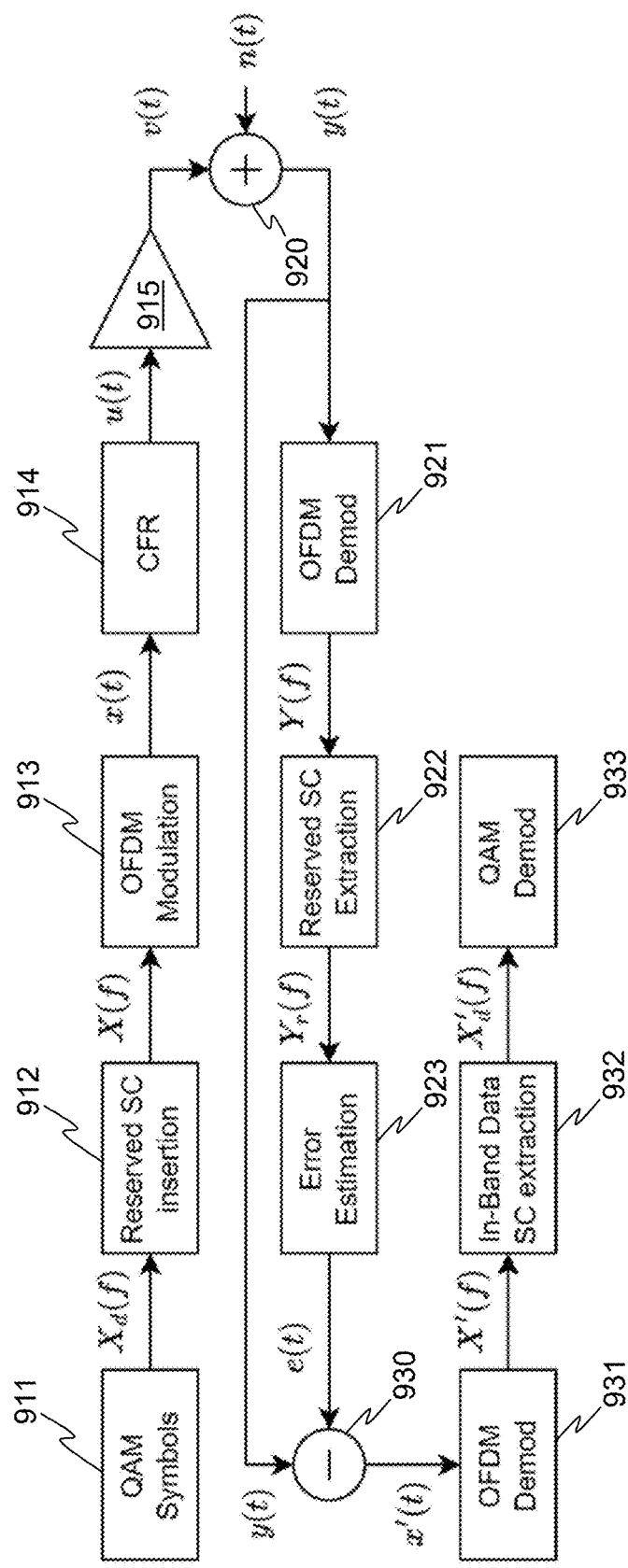
FIG. 9 is an example flowchart illustrating signal processing steps of the OOB-CS, according to some embodiments of this disclosure.

FIG. 9 illustrates a signal processing flowchart utilizing the OOB-CS method to enhance the compensation for distortions such as HC and PA nonlinearities. This process begins with the generation of QAM symbols $X_d(f)$ (block 911). These symbols are mapped onto specific indices within the transmitted OFDM frame, taking into account subcarriers (SC) reserved for noise (block 912).

OFDM modulation (block 913) is then applied, transforming the mapped QAM symbols X(f) into a time-domain OFDM signal x(t). To reduce the PAPR of the signal and increase the PAE of the PA, a CFR operation (block 914) may be performed to obtain u(t) before the signal is amplified by the PA (block 915) to obtain v(t) and then transmitted. During the transmission, additional noise n(t) may be combined with the signal at 920.

Upon reception, the OFDM time-domain signal y(t) is acquired by the receiver, and a second copy of this signal is retained. The received signal is then demodulated (block 921) to convert it back into a frequency-domain representation Y(f). Then, at 922, reserved subcarriers (SC) are extracted, which include noise-reserved tones from both IB and OOB components, and the extracted signal $Y_r(f)$ is passed to an error estimation block 923. This block employs an $l_1$ optimization technique, such as Least Absolute Shrinkage and Selection Operator (LASSO), to estimate the error e(t) present in the received signal.

The estimated error e(t) is then subtracted from the retained second copy of the received OFDM signal y(t) at 930 to generate a reconstructed time-domain signal x'(t). This reconstructed signal then undergoes a second round of OFDM demodulation (block 931) to isolate and extract the IB data subcarriers (SC) (block 932). The IB data subcarriers are then demodulated using QAM demodulation (block 933) to recover the original bit-stream without noise or distortion.

As shown, this embodiment uses reserved IB and OOB subcarriers to estimate and correct distortions within the signal, thereby improving the signal quality at the receiver relative to the transmitter. This method also does not require a priori knowledge of the distortions to be compensated, hence it is "blind". The OOB-CS system provides a method of post-compensation that can be efficient when the transmitter and receiver are accessible for analysis.

Various embodiments described herein provide advances in the reconstruction of signals, particularly when such signals have been distorted at the transmitter or during transmission. The OOB-based blind reconstruction methods described herein provide a solution for improving BER and EVM without prior knowledge of the specific nonlinearities that have affected the transmitted signal. This approach is well suited to handle various forms of distortion, including phase shifts and memory effects.

One of the advantages of the disclosed methods is that they do not rely on tone reservation, which typically reduces the number of carriers available for data transmission. By eliminating the need for reserved tones, the disclosed embodiments can potentially increase the data rate by making efficient use of the available spectrum by allocating more subcarriers for data transmission.

The application of OOB-CS in some embodiments may further improve transmission efficiency. The OOB-CS methods take advantage of spectral regrowth-often considered unwanted noise—to improve distortion estimation and thus allow for more accurate compensation. As a result, fewer IB subcarriers need to be reserved for error estimation, freeing up additional bandwidth for data transmission. This results in an overall improvement in transmission rate and received signal quality. In particular, the OOB-CS method contributes to higher restoration quality by sampling the spectral regrowth, which is rich in noise information. This is similar to increasing the number of IB tones used for distortion compensation. Notably, OOB-CS also provides a means to attenuate AM/PM distortion, which is often a byproduct of nonlinear signal amplification.

The embodiments described herein may be implemented in various applications within the realm of communications.

In some cases, the embodiments may be well suited for integration into the baseband processing unit of wireless communication links. This integration is illustrated in FIG. 1, for example, which shows the adaptability of the system to existing wireless infrastructure. The appropriate wireless system for this technology is one with flexible adjacent channel leakage ratio (ACLR) requirements that ensure PA distortion does not exceed the specified emission mask criteria. The overall architecture of such a wireless system includes a baseband signal generation block, which may consist of dedicated DSP hardware or a radio frequency system-on-chip (RFSoC) field programmable gate array (FPGA). The generated signal may be transmitted through an RF front-end—primarily the source of distortion-before being propagated over the air through a variable transmission environment. Upon reception, the signal encounters a receiver front end, which is typically linear and does not introduce significant distortion, followed by demodulation by dedicated DSP hardware designed for OFDM signal processing.

In some other cases, the embodiments may be used in Radio-over-Fiber (RoF) systems. In such systems, the post-compensation methods may be applied after the optical-to-electrical conversion process. This demonstrates the ability of the system to improve signal integrity in communication environments that are not simply wireless, where the conversion of optical signals back to electrical signals may introduce additional levels of distortion. Implementing post-compensation in RoF systems ensures that signal integrity is maintained throughout the conversion and transmission process, optimizing the quality of the data received.

Acronyms

| Acronym/Abbreviation/ Initialism | Full Name |
| --- | --- |
| 5G | Fifth Generation Communications Networks |
| ADC | Analog-to-Digital Converter |
| AM/AM | Amplitude-to-Amplitude Distortion |
| AM/PM | Amplitude-to-Phase Distortion |
| AWGN | Additive White Gaussian Noise |
| BER | Bit-Error Rate |
| BP | Basic Pursuit |
| CDF | Cumulative Distribution Function |
| CFR | Crest Factor Reduction |
| CNC | Clipping Noise Cancellation |
| CS | Compressive Sensing |
| DAC | Digital-to-Analog Conversion |
| DAR | Decision-Aided Reconstruction |
| DPD | Digital Pre-Distortion |
| DSP | Digital Signal Processing |
| EVM | Error Vector Magnitude |
| FD | Frequency-Domain |
| FFT | Fast Fourier Transform |
| FPGA | Field Programmable Field Array |
| HC | Hard-Clipping |
| IB | In-Band |
| IBO | Input Back-Off |
| IFFT | Inverse Fast Fourier Transform |
| IP | Intellectual Property |
| LASSO | Least Absolute Shrinkage and Selection Operator |
| LMS | Least Mean Squares |

-continued

| Acronym/Abbreviation/ Initialism | Full Name |
|---|---|
| MIMO | Multiple-Inputs Multiple-Outputs |
| NL | Nonlinear |
| NR | New Radio |
| OFDM | Orthogonal Frequency Division Multiplexing |
| OOB | Out-Of-Band |
| PA | Power Amplifier |
| PAE | Power Added Efficiency |
| PAPR | Peak-to-Average Power Ratio |
| PC | Post-Compensation |
| P/S | Parallel to Serial |
| RF | Radio Frequency |
| RoF | Radio-over-Fiber |
| Rx | Receiver |
| RFSoC | Radio-Frequency System-on-Chip |
| SISO | Single-Input Single-Output |
| SNR | Signal-to-Noise Ratio |
| S/P | Serial to Parallel |
| TD | Time-Domain |
| Tx | Transmitter |
| UE | User Equipment |

Herein, the terms "distortion" and "noise" may be used interchangeably to refer to any unwanted alteration of the signal caused by various factors in the communication system. Both terms are intended to encompass a range of phenomena including, but not limited to, nonlinearities, interference, and other artifacts that affect the integrity of the signal as it is processed and transmitted. This usage does not imply that the two are identical in all contexts; rather, it reflects the fact that in the systems and methods described, the approaches to mitigating these unwanted changes are not fundamentally different whether one refers to them as distortions or as noise.

Herein, use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Herein, various embodiments of the OOB-based post-compensation methods are described. In various embodiments, the OOB-based post-compensation methods disclosed herein may be implemented as hardware, software, firmware, or a combination thereof, and may be implemented in any suitable form.

For example, in some embodiments, the OOB-based post-compensation methods disclosed herein may be implemented as computer-executable instructions stored in one or more non-transitory computer-readable storage devices (in the form of software, firmware, or a combination thereof) such that, the instructions, when executed, may cause one or more physical components such as one or more circuits to perform the OOB-based post-compensation methods disclosed herein.

For example, in some embodiments, an apparatus comprising one or more processors functionally connected to one or more non-transitory computer-readable storage devices or media may be used to perform the methods disclosed herein, wherein the one or more non-transitory computer-readable storage devices or media store the computer-executable instructions of the methods disclosed herein, and the one or more processors may read the computer-executable instructions from the one or more non-transitory computer-readable storage devices or media, and executes the instructions to perform the methods disclosed herein.

In some embodiments, an apparatus may not have any processors or computer-readable storage devices or media. Rather, the apparatus may comprise any other suitable physical or virtual (explained below) components for implementing the methods disclosed herein.

In some embodiments, the computer-executable instructions that implement the methods disclosed herein may be one or more computer programs, one or more program products, or a combination thereof.

In some embodiments, the methods disclosed herein may be implemented as one or more circuits, one or more components, one or more units, one or more modules, one or more integrated-circuit (IC) chips, one or more chipsets, one or more devices, one or more apparatuses, one or more systems, and/or the like.

The one or more circuits, one or more components, one or more units, one or more modules, one or more IC chips, one or more chipsets, one or more devices, one or more apparatuses, or one or more systems may be physical, virtual, or a combination thereof. Herein, the term "virtual" (such as a "virtual apparatus") refers to a circuit, component, unit, module, chipset, device, apparatus, system, or the like that is simulated or emulated or otherwise formed using suitable software or firmware such that it appears as if it is "real" or physical).

The present disclosure encompasses various embodiments, including not only method embodiments, but also other embodiments such as apparatus embodiments and embodiments related to non-transitory computer readable storage media. Embodiments may incorporate, individually or in combinations, the features disclosed herein.

Although this disclosure refers to illustrative embodiments, this is not intended to be construed in a limiting sense. Various modifications and combinations of the illustrative embodiments, as well as other embodiments of the disclosure, will be apparent to persons skilled in the art upon reference to the description.

Features disclosed herein in the context of any particular embodiments may also or instead be implemented in other embodiments. Method embodiments, for example, may also or instead be implemented in apparatus, system, and/or computer program product embodiments. In addition, although embodiments are described primarily in the context of methods and apparatus, other implementations are also contemplated, as instructions stored on one or more non-transitory computer-readable media, for example. Such media could store programming or instructions to perform any of various methods consistent with the present disclosure.

Those skilled in the art will appreciate that the above-described embodiments and/or features thereof may be customized, separated, and/or combined as needed or desired. Moreover, although embodiments have been described above with reference to the accompanying drawings, those of skill in the art will appreciate that variations and modifications may be made without departing from the scope thereof as defined by the appended claims.

What is claimed is:
1. A method, comprising:
receiving a signal that is distorted by a transmitter, wherein the received signal includes in-band (IB) com- ponents, at least some of which carry data and distortion, and out-of-band (OOB) components indicative of the distortion;
  decomposing the received signal to distinguish at least one of the IB components from at least one of the OOB components; and
  reducing the distortion in the received signal by using content in the at least one of the OOB components to output a compensated signal.

2. The method of claim 1, wherein the decomposed signal comprises one of non-contiguous subcarriers, contiguous subcarriers, or multiple sub-bands.

3. The method of claim 1, wherein the reducing comprises:
  identifying distortion characteristics within the decomposed signal using the at least one of the OOB components;
  estimating an error associated with the at least one of the IB components using the identified distortion characteristics; and
  applying a compensator to the received signal to reduce the estimated error.

4. The method of claim 3, further comprising:
  implementing one or more polynomials to model the distortion characteristics associated with the received signal; and
  forming the compensator with the polynomial.

5. The method of claim 4, wherein the polynomial is defined by a set of coefficients that model nonlinear effects of distortion on the received signal, the coefficients being adjusted using an algorithm comprising at least one of a least mean squares (LMS) algorithm, a recursive least squares (RLS) algorithm, a normalized least mean squares (NLMS) algorithm, or a least squares (LS) algorithm.

6. The method of claim 5, wherein the estimating further comprises:
  deriving an error signal from the at least one of the OOB components;
  inputting the derived error signal into the algorithm to update the coefficients of the polynomial; and
  iteratively updating the coefficients using an output of the algorithm until predetermined error vector magnitude (EVM) criteria are met, wherein the EVM criteria are indicative of the compensated signal reaching a target fidelity threshold relative to the received signal.

7. The method of claim 4, wherein the polynomial is a memory polynomial that includes memory effects by incorporating additional coefficients corresponding to previous time instances of the received signal.

8. The method of claim 3, further comprising:
  applying a decision-aided reconstruction (DAR) to the compensated signal to restore clipped portions therein, including:
    performing a maximum likelihood estimation on quadrature amplitude modulation (QAM) symbols;
    converting the QAM symbols to time-domain to perform a clipping restoration; and
    converting the restored signal back into the QAM symbols.

9. The method of claim 8, further comprising setting a clipping threshold within the clipping restoration, wherein the clipping threshold is the maximum power of the compensated signal.

10. The method of claim 1, further comprising, prior to the decomposing, making a second copy of the received signal, wherein the at least one of the IB components comprises randomly allocated subcarriers without carrying data, and wherein the reducing comprises:
  reducing the distortion of the at least one of the IB components using contiguous subcarriers of the at least one of the OOB components.

11. The method of claim 10, wherein the compensating comprises:
  extracting reserved subcarriers comprising the contiguous subcarriers of the at least one of the OOB components and the randomly allocated subcarriers of the at least one of the IB components;
  estimating an error associated with the received signal by compressive sensing the extracted reserved subcarriers by optimization; and
  generating the compensated signal with reduced distortion by a difference between the second copy of the received signal and the estimated error.

12. The method of claim 11, further comprising, after the generating:
  demodulating the compensated signal into a compensated frequency-domain signal; and
  sampling the data subcarriers from the compensated frequency-domain signal to obtain the compensated signal.

13. The method of claim 1, wherein the received signal is without predetermined information about the distortion in the IB components.

14. An apparatus comprising:
  one or more circuits configured to execute instructions stored in one or more memories and cause the apparatus to perform actions comprising:
    receiving a signal that is distorted by a transmitter wherein the received signal includes in-band (IB) components, at least some of which carry data and distortion, and out-of-band (OOB) components indicative of distortion;
    decomposing the received signal to distinguish at least one of the IB components from at least one of the OOB components; and
    reducing the distortion in the received signal by using content in the at least one of the OOB components to output a compensated signal.

15. The apparatus of claim 14, wherein the reducing comprises:
  identifying distortion characteristics within the decomposed signal using the at least one of the OOB components;
  estimating an error associated with the at least one of the IB components using the identified distortion characteristics; and
  applying a compensator to the received signal to reduce the estimated error.

16. The apparatus of claim 14, wherein the actions further comprise, prior to the decomposing, making a second copy of the received signal, wherein the at least one of the IB components comprises randomly allocated subcarriers without carrying data, and wherein the reducing comprises:
  reducing the distortion of the at least one of the IB components using contiguous subcarriers of the at least one of the OOB components.

17. One or more non-transitory computer-readable storage devices comprising computer-executable instructions, wherein the instructions, when executed, cause one or more circuits to perform actions comprising:
  receiving a signal that is distorted by a transmitter wherein the received signal includes in-band (IB) components, at least some of which carry data and distortion, and out-of-band (OOB) components indicative of distortion;

decomposing the received signal to distinguish at least one of the IB components from at least one of the OOB components; and reducing the distortion in the received signal by using content in the at least one of the OOB components to output a compensated signal.

18. The one or more non-transitory computer-readable storage devices of claim 17, wherein the reducing comprises:

identifying distortion characteristics within the decomposed signal using the at least one of the OOB components;

estimating an error associated with the at least one of the IB components using the identified distortion characteristics; and applying a compensator to the received signal to reduce the estimated error.

19. The one or more non-transitory computer-readable storage devices of claim 17, wherein the actions further comprise, prior to the decomposing, making a second copy of the received signal, wherein the at least one of the IB components comprises randomly allocated subcarriers without carrying data, and wherein the reducing comprises:

reducing the distortion of the at least one of the IB components using contiguous subcarriers of the at least one of the OOB components.

20. The one or more non-transitory computer-readable storage devices of claim 17, wherein the received signal is without predetermined information about the distortion in the IB components.

* * * * *